Patented Dec. 19, 1950

2,534,698

UNITED STATES PATENT OFFICE 2,534,698

POLYMERIZATION OF OLEFINS IN FLUORINATED DILUENT

John D. Calfee, Manhasset, N. Y., and Robert M. Thomas, Baton Rouge, La., assignors to Standard Oil Development Company, a corporation of Delaware No Drawing. Application November 29, 1944, Serial No. 565,792

9 Claims. (Cl. 260—85.3)

1

This invention relates to polymerization processes, relates particularly to low temperature polymerization processes for olefinic materials in the presence of Friedel-Crafts type catalysts, and relates especially to low temperature Friedel-Crafts polymerizations of olefins in the presence of fluid, non-solvent, fluorine substituted hydrocarbons.

In the prior art it has been found possible to polymerize olefins such as isobutylene, either alone or in the presence of polyolefins, by the application to the olefinic material of solutions of Friedel-Crafts catalysts at temperatures ranging from about $-10°$ C. to about $-164°$ C. to yield very high molecular weight polymers. However, this reaction is a difficult one and the products are difficult to handle because of the very great stickiness of the polymers at temperatures slightly below room temperature.

The present invention conducts the polymerization in the presence of a non-solvent for the reactants and the polymer, which is also insoluble in the polymer, to permit of the production of a suspension of the olefinic material at the low polymerization temperature and the retention of the material after polymerization in fine grained slurry form. For this purpose, the polymerization reaction is conducted in the presence of fluorine substituted hydrocarbons which, in contrast to the other halides, show a low solubility both for the olefins and for the polymer produced from them. The low solubility of the polymer in the fluorine substituted hydrocarbons and the low solubility of the fluoride compound in the polymer greatly reduces the stickiness otherwise characteristic of the polymer when prepared in hydrocrabon or chlorohydrocarbon media, and permits of a ready separation of the polymer from the polymerization mixture and warming up of the polymer with a minimum of coalescence and cohesion of the polymer particles.

Thus, the invention polymerizes an isobutylene-containing material at low temperature by the application thereto of a Friedel-Crafts catalyst, in the presence of fluid, non-solvent, fluorine substituted compounds. Other objects and details of the invention will be apparent from the following description.

The polymerization mixture of the present invention utilizes preferably an isoolefin such as isobutylene; although other isoolefins such as 2-methyl butene-1 or 2-methyl pentene-1 or 2-methyl hexene-1 may under some circumstances also be utilized. The isoolefin may be polymerized alone, but usually it is preferable to prepare a mixture containing a major proportion of isobutylene with a minor proportion of a polyolefin containing from 4 to 12 or 14 carbon atoms, conjugated diolefins of 4 to 6 carbon atoms, such as butadiene, isoprene, piperylene, dimethyl butadiene, and other polyolefins such as dimethallyl, myrcene and the like being particularly useful. The preferred proportion of the materials is from 70 to 99.5 parts of the isoolefin with from 30 to 0.5 parts of the polyolefin. (It may be noted that the polyolefin may be conjugated or non-conjugated and may contain two, three, or more double linkages up to the maximum obtainable in a 14 carbon atom multiolefin.) This olefinic material is cooled to a temperature below $0°$ C., usually preferably below $-40°$ C. to within the range between $-40°$ C. and about $-100°$ C., although in some instances temperatures lower than $100°$ C. down to as low as $-164°$ C. are advantageous.

The polymerization catalyst is broadly a Friedel-Crafts catalyst as shown by N. O. Calloway in his article on "The Friedel-Crafts Synthesis," printed in the issue of "Chemical Reviews," published for the American Chemical Society at Baltimore in 1935 in Volume XVII, No. 3, the article beginning on page 327, the list being particularly well shown on page 375. Preferably the Friedel-Crafts catalyst is used in solution in a low-freezing, non-complex forming solvent; that is, a solvent which is inert with respect to the catalyst and liquid at the polymerization temperature. The preferred catalyst is aluminum chloride in solution in ethyl or methyl chloride or carbon disulfide. With certain of the polyolefins, gaseous boron trifluoride may also be used. Certain of the Friedel-Crafts catalysts such as aluminum bromo chloride are soluble in hydrocarbons such as liquid propane, liquid butane, liquid pentane, liquid hexane and the like, which may also be used as catalyst solvents. Boron trifluoride also is soluble in hydrocarbons, and the solubility is sufficiently high to permit of the use of the dissolved boron trifluoride with all of the polyolefins. Thus, the catalyst solvent broadly is a saturated, linear carbon chain, non-complex forming, low-freezing organic compound having from 1 to 6, inclusive, carbon atoms per molecule.

The cooling of the olefinic material is preferably obtained by a refrigerating jacket which may contain any of the convenient refrigerants such as liquid ethylene, liquid ethane, liquid or solid carbon dioxide, liquid propane, liquid butane, liquid sulfur dioxide, liquid pentane, especially under vacuum, liquid methane, especially under pressure, and the like. It is preferable that these refrigerants be excluded from the polymerization mixture per se, except carbon dioxide, which may be present in the olefinic material either in liquid or solid form, and in some instances is an advantageous refrigerant, since it further reduces the solubility of the olefinic material and polymer, especially in the small amounts of catalyst solvent which must be added.

The polymerization mixture contains in addition, from 50 parts to 1000 parts by weight of a fluorine-substituted hydrocarbon, per 100 parts by weight of the olefinic material. The fluorine-substituted hydrocarbon may have from 1 to 15 carbon atoms per molecule and may contain from a single fluorine atom substituent to a sufficient number to replace all of the hydrogen atoms in the hydrocarbon with fluorine. It may be noted that the fully fluorinated hydrocarbons are the preferred components, since the fully fluorinated and nearly fully fluorinated compounds show the highest insolubility in, and for, the olefinic material, both before and after polymerization. The mono-fluoro compounds mostly are more or less soluble in the olefinic material and the compounds having intermediate numbers of fluorine atom substituents show intermediate degrees of solubility. Since, however, it is not essential for the polymerization reaction, that complete insolubility be had, the partially fluorinated compounds are usable with many of the reaction mixtures. Accordingly, the preferred components are such substances as carbontetrafluoride, hexafluoroethane, octafluoropropane, decafluorobutane and the like. However, such substances as fluoroform, tetrafluoroethane, hexafluoropropane, octafluorobutane and the like are nearly as satisfactory. The less highly fluorinated compounds are also useful for various special polymerizations.

In practicing the invention, the olefinic mixture with the alkyl fluoride is prepared at the desired temperature in any convenient way, the sequence of mixing and cooling being immaterial. The mixture in a convenient reactor is then stirred vigorously to produce and maintain a more or less fine grained "emulsion" or "slurry" of the liquid olefinic material in the alkyl fluoride, sufficient of the alkyl fluoride being utilized to ensure a continuous phase of the alkyl fluoride with a disperse phase of the olefinic material. The catalyst is then added in any convenient way. It may be sprayed, in the form of a finely divided liquid, onto the surface of the rapidly stirred emulsion or suspension; or it may be delivered in the form of a fine jet into a zone of high turbulence or an eddy zone in the olefin-fluorinated hydrocarbon mixture produced by a powerful stirring means. With those mixtures which can be polymerized by gaseous boron trifluoride, the gaseous catalyst may be simply bubbled through the rapidly stirred mixture. When liquid titanium chloride is used it also may be sprayed on the surface of the rapidly stirred mixture, or may be delivered as a jet into the mixture and stirred in. These catalysts are rapid acting catalysts, which yield a complete reaction in less than a second, and accordingly, rapid dispersion of the catalyst into the olefinic material is highly desirable. However, when hydrocarbon-soluble catalysts are used, they are found to be slower acting and, accordingly, this characteristic reduces the severity of the requirement for stirring.

With the powerful catalysts the reaction may be substantially complete by the time the addition of catalyst is complete. In the case of aluminum chloride in solution in methyl chloride, a convenient solution contains from 0.5 gram per 100 of solution to saturation, and approximately 0.5 part by weight of aluminum chloride is required per 100 parts by weight of olefinic material for polymerization. Normally the polymerization is not carried to completion, but only sufficient catalyst is added to carry the polymerization to from 60% to 90% of the olefinic material present. Ordinarily, 1 part by weight of aluminum chloride is sufficient to polymerize completely 100 parts by weight of olefinic mixture; and similar relationships hold with other catalysts, although slightly greater amounts of boron trifluoride are required and slightly greater amounts of titanium tetrachloride may also be required with similar amounts, occasionally slightly small amounts, of aluminum chloro bromide.

It may be noted that the fineness of division of the olefinic emulsion, and correspondingly the fineness of division of the polymer emulsion or slurry depends to a considerable extent upon the intensity of the stirring, since most of the alkyl fluorides are enough heavier than the olefinic material to separate promptly into two layers, and to "cream" the emulsion or slurry rapidly to the surface. Accordingly, when the polymerization reaction has reached the desired stage, the material may be discharged into a convenient receptacle in which it may be brought up to room temperature. With the preferred fluorides the fluorides volatilize out, leaving the polymer and any unpolymerized olefinic material behind, making it possible to recover both for reuse. With a few of the higher boiling fluorides the unpolymerized olefinic material may be volatilized out first and recovered for reuse, leaving a slurry of emulsion or polymer in alkyl fluoride which is nearly free from low boiling hydrocarbons. Alternatively, if the material is warmed up, without stirring, considerable "creaming" and coalescence of the polymer or slurry may occur, making a simple sieving operation satisfactory for removal of the solid polymer.

On the other hand, the reaction mixture may, especially if the stirring has been of such an intensity as to yield a moderately coarse grained slurry, be strained at the polymerization temperature, the solid polymer being removed, the residual liquid olefins flowing through the strainer with the alkyl fluoride. The strained out solid slurry may then be brought up to room temperature in any convenient way and the alkyl fluoride may be reused with its content of olefinic material for another polymerization, thereby avoiding the loss of refrigeration which otherwise occurs when the fluoride is brought up to room temperature and then recooled to polymerization temperature. The polymer material may then be purified in the usual way and compounded, cured and otherwise processed by the same processes which are usually applied to such polymeric materials.

Thus, the invention broadly is the polymerization of olefinic material in suspension in a diluent in which it is very slightly soluble or insoluble.

Fluorine substituted hydrocarbons which are particularly useful for this reaction; which show the highest degree of insolubility are:

|  | Freezing Point | Boiling Point |
|---|---|---|
|  | °C. | °C. |
| Carbontetrafluoride, $CF_4$ |  | −128.0 |
| Hexafluoroethane, $C_2F_6$ | −103 | −78 |
| Octafluoropropane, $C_3F_8$ | −183 | −36 |
| Decafluorobutane, $C_4F_{10}$ | −84.5 | 4 |
| Dodecafluoropentane, $C_5F_{12}$ | −10 | 30 |
| Of nearly as good utility are: |  |  |
| Fluoroform, $CHF_3$ | −183 | −82.2 |
| Tetrafluoroethylene, $C_2F_4$ | −144 | −78.4 |
| Pentafluoroethane, $C_2HF_5$ | −103 | −48 |
| Tetrafluoroethane, $C_2H_2F_4$ |  | −23 |

A more complete list of fluorine compounds may be found in Adams, et al., Organic Reactions II, John Wiley, New York, 1944, p. 76.

Other fluorine compounds which show a less complete insolubility or are miscible with the olefinic material, but which are useful for some polymerizations, are such compounds as:

|  | Freezing Point | Boiling Point |
|---|---|---|
|  | °C. | °C. |
| Difluoromethane, $CH_2F_2$ |  | −51.6 |
| 1,1-difluoroethane, $C_2H_4F_2$ | −117 | −24.7 |
| 2,2-difluoropropane, $C_3H_6F_2$ | −104.8 | −0.1 |
| 1,1-difluoropropane, $C_3H_6F_2$ |  | 7–8 |
| 2,2-difluorobutane, $C_4H_8F_2$ |  | 30.8 |

The difluoro derivatives of pentane, hexane and heptane have higher melting and boiling points and are less satisfactory because of these characteristics.

The chlorine-containing compounds with fluorine are considerably less satisfactory since many of them show a fairly high solubility in and for the cold olefinic material. However, they are in some instances useful in a mixed diluent where most of the diluent consists of the highly insoluble fully fluorinated compounds, or nearly fully fluorinated compounds, with the fluoro-chloro-compounds as diluents which may in some polymerizations play effectively helpful parts in the polymerization, both to modify the polymerization reaction and to modify the character of polymer obtained. For this purpose the useful compounds include such substances as:

|  | Freezing Point | Boiling Point |
|---|---|---|
|  | °C. | °C. |
| Carbon chlorofluoride, $CCl_2F_2$ | −155 | −29 |
| Chlorofluoropropane, $CHF_2$—$CHCl$—$CF_3$ | −130.4 | +6.8 |
| Chlorofluoroethane, $CHClF$—$CHClF$ | −112 | +20.9 |

It will be obvious to those skilled in the art that a considerable number of chlorofluoro compounds of this type having up to 4, 5 or 6 carbon atoms may be produced, and those which have freezing points below the polymerization temperature are more or less useful, at least as diluents in the reaction. It may be noted that relatively very few of the compounds having more than 5 carbon atoms per molecule have sufficiently low freezing points.

EXAMPLE 1

A mixture was prepared consisting of 97.5 parts by weight of isobutylene of 99% purity and 2.5 parts by weight of isoprene of 96% purity. This mixture was diluted with 300 parts by weight of decafluorobutane in a suitable reactor. It was noted that the two liquids separated into an upper and a lower layer. A powerful propeller type stirrer was then put into operation in the reactor, breaking up the olefinic mixture into a relatively fine dispersion of particles in the alkyl fluoride. The reactor and its contents were cooled by a refrigerating jacket of liquid ethylene, bringing the temperature to approximately −100° C. With the stirrer in vigorous operation, a catalyst solution consisting of 0.6 part of aluminum chloride in solution in 100 parts of methyl chloride was then added to the vigorously stirred reaction mixture in the form of a fine spray applied onto the surface of the reaction mixture. The methyl chloride solution was rapidly stirred into coalescence with particles of olefinic material. The polymerization reaction proceeded nearly as rapidly as in a homogeneous mixture free from alkyl fluoride, to yield a solid polymer.

The polymer was collected from the reaction mixture, drained to remove as much as possible of the alkyl fluoride and unpolymerized olefinic monomers and was then brought up to room temperature.

Accurate molecular weight determinations were not possible because of the partial insolubility of the resulting polymer. However, the properties of the polymer as compared with other, fully soluble polymers, suggested a molecular weight, or "Staudinger number" of approximately 35,000 since the polymer was adequately plastic and milled easily. Unsaturation as determined by the Wijs method showed the polymer to have an iodine number of approximately 1.

The polymer was then washed on the roll mill to remove as much of the residual traces of catalyst as possible and was dried on the mill.

The polymer was then compounded according to the following recipe:

*Recipe I*

| | Parts by weight |
|---|---|
| Isobutylene-isoprene copolymer | 100 |
| Stearic acid | 3 |
| Zinc oxide | 5 |
| Carbon black | 50 |
| Tuads (tetramethyl thiuram disulfide) | 1 |
| Sulfur | 3 |

It may be noted that this polymer compounds to a superior product when the recipe contains approximately 50 parts of carbon black per 100 parts of polymer than it does with smaller parts of carbon black.

This compound was readily prepared on the mill, the polymer proving to be sufficiently plastic to be readily processed.

The compounded polymer was then placed in molds and cured at 307° F. for 30 minutes. The cured polymer was found to have a tensile strength of approximately 2200 lbs. per square inch and an elongation at break of approximately 1200%.

EXAMPLE 2

A similar polymerization was conducted using hexafluoroethane which served both as non-solvent diluent and refrigerant. This material, as shown by the above table, has a freezing point of −103° C. and a boiling point of −78° C. The same olefinic mixture was used with the same proportions of diluent and the same catalyst, but without a refrigerating jacket, the polymerization temperature being −78° as set by the boiling point of the ethyl hexafluoride. The polymerization proceeded substantially as above pointed out, but with a somewhat lower molecular weight in the final product because of the higher temperature. However, this material also, when compounded as above outlined, yielded a cured material having an adequate tensile strength and a similar elongation.

EXAMPLE 3

A mixture was prepared, consisting of 975 parts by weight of isobutylene of 99% purity and 2.5 parts by weight of isoprene of 96% purity. This mixture was then intermixed with 300 parts by weight of carbon tetrafluoride at a temperature of approximately −125° C. to −128° C. as set by the boiling point under atmospheric pressure of carbon tetrafluoride. As in Example 1, the materials separated into two layers and were found to be mutually insoluble. A powerful stirrer was then put into operation in the reactor, breaking up the olefinic mixture into a relatively fine dispersion of particles or droplets of the olefinic material in the carbon tetrafluoride. With the stirrer in vigorous operation the catalyst, as in Example 1, was added to the mixture in the form of a fine spray applied on to the surface of the rapidly stirred mixture. The catalyst solution passed rapidly into the olefinic material and yielded a rapid interpolymerization of the isobutylene and isoprene. The resulting solid polymer was found to be in the form of a good, fine-grained suspension or slurry in the carbon tetrafluoride from which it was easily separated by "creaming" and straining.

The polymer was then treated as in Example 1 to yield a similar high quality substitute for caoutchouc.

This reaction in the presence of a non-solvent diluent or diluent refrigerant may be conducted batchwise, or may be conducted as a continuation process, in the latter instance a steady stream of feed material being passed into a reactor, treated with a catalyst, and the polymerizate slurry discharged from the reactor. This form of the process is particularly advantageous, because of the strong tendency of the slurry to "cream," bringing the solid polymer to the top of the mixture where it is readily skimmed off and strained to remove the excess diluent. The diluent with its content of unpolymerized olefins may be returned to the reactor after admixture with fresh portions of olefinic material.

Alternatively and preferably, the cold residue may be separated by a fractional distillation into the various components in order to remove traces of impurities, and catalyst poisons resulting from said reactions. For this purpose the residue is preferably passed through a series of fractionating columns at atmospheric pressure, with heat interchange equipment connected between the successive columns to minimize the amount of refrigeration required in the purification. By this fractional separation at atmospheric pressure with heat interchangers, a purification is obtainable which requires only a very small amount of additional refrigeration. By the process of the invention olefinic materials are polymerized in a non-solvent, immiscible diluent liquid in dispersed form to yield a material which is much more easily separated from the reaction mixture with much less tendency towards coalescence and cohesion.

While there are above disclosed but a limited number of embodiments of the process of the invention, still other embodiments can be produced without departing from the inventive concept herein disclosed and it is therefore desired that only such limitations be imposed upon the appended claims as are stated therein or required by the prior art.

The invention claimed is:

1. A polymerization process comprising the steps in combination of dispersing a mixture of isobutylene and a polyolefin having 4 to 14 carbon atoms per molecule, into a body of a fluorine substituted aliphatic hydrocarbon containing material without substantial solution therein, in the proportion of from one-half part to 10 parts of fluorine substituted aliphatic hydrocarbon per part of olefinic monomer; the said fluorine substituted aliphatic hydrocarbon having from one to five carbon atoms per molecule which is liquid at the polymerization temperature and polymerizing the dispersed mixture of isobutylene and polyolefin having four to fourteen carbon atoms per molecule at temperatures between −20° C. and −164° C. by the application thereto of a Friedel-Crafts catalyst.

2. A polymerization process comprising the steps in combination of dispersing a mixture of a major proportion of isobutylene and a minor proportion of a conjugated diolefin of 4 to 6 carbon atoms into a body of a fully fluorinated aliphatic hydrocarbon without substantial solution therein, in the proportion of from 0.5 part to 10 parts of the fluorinated hydrocarbon per part of olefinic monomer; the said fluorinated hydrocarbon having 1 to 5 carbon atoms per molecule and being liquid at the polymerization temperature; and polymerizing the dispersed mixture of isobutylene and diolefin at a temperature between −20° C. and −164° C. by the application thereto of aluminum chloride dissolved in an alkyl chloride of 1 to 2 carbon atoms.

3. A polymerization process comprising the steps in combination of dispersing a mixture of isobutylene and butadiene into a body of a fluorine substituted alkyl hydrocarbon containing material without substantial solution therein, in the proportion of from one-half part to 10 parts of fluorine substituted aliphatic hydrocarbon per part of olefinic monomer; the said fluorine substituted aliphatic hydrocarbon having from one to five carbon atoms per molecule which is liquid at the polymerization temperature and polymerizing the dispersed mixture of isobutylene and butadiene at temperatures between −20° C. and −164° C. by the application thereto of a Friedel-Crafts catalyst.

4. A polymerization process comprising the steps in combination of dispersing a mixture of isobutylene and isoprene into a body of a fluorine substituted alkyl hydrocarbon containing material without substantial solution therein, in the proportion of from one-half part to 10 parts of fluorine substituted aliphatic hydrocarbon per part of olefinic monomer; the said fluorine substituted aliphatic hydrocarbon having from one to five carbon atoms per molecule which is liquid at the polymerization temperature and polymerizing the dispersed mixture of isobutylene and isoprene at temperatures between −20° C. and −164° C. by the application thereto of a Friedel-Crafts catalyst.

5. A polymerization process comprising the steps in combination of dispersing a mixture of isobutylene and dimethyl butadiene into a body of a fluorine substituted alkyl hydrocarbon containing material without substantial solution therein, in the proportion of from one-half part to 10 parts of fluorine substituted aliphatic hydrocarbon per part of olefinic monomer; the said fluorine substituted aliphatic hydrocarbon having from one to five carbon atoms per molecule which is liquid at the polymerization temperature and polymerizing the dispersed mixture of isobutylene and dimethyl butadiene at temperatures between $-20°$ C. and $-164°$ C. by the application thereto of a Friedel-Crafts catalyst.

6. A polymerization process comprising the steps in combination of mixing together decafluorobutane in the proportion of from one-half part to 10 parts, isobutylene, a polyolefin having from 4 to 14, inclusive, carbon atoms per molecule and a Friedel-Crafts catalyst comprising aluminum chloride in solution in a saturated linear carbon chain non-complex forming, low-freezing solvent at a temperature within the range between $-20°$ C. and $-164°$ C.

7. A polymerization process comprising the steps in combination of mixing together decafluorobutane in the proportion of from one-half part to 10 parts, isobutylene, butadiene and a Friedel-Crafts catalyst comprising aluminum chloride in solution in a saturated linear carbon chain non-complex forming, low-freezing solvent at a temperature within the range between $-20°$ C. and $-164°$ C.

8. A polymerization process comprising the steps in combination of mixing together decafluorobutane in the proportion of from one-half part to 10 parts, isobutylene, dimethyl butadiene and a Friedel-Crafts catalyst comprising aluminum chloride in solution in a saturated linear carbon chain non-complex forming, low-freezing solvent at a temperature within the range between $-20°$ C. and $-164°$ C.

9. A polymerization process comprising the steps in combination of mixing together decafluorobutane in the proportion of from one-half part to 10 parts, isobutylene, isoprene and a Friedel-Crafts catalyst comprising aluminum chloride in solution in a saturated linear carbon chain non-complex forming, low-freezing solvent at a temperature within the range between $-20°$ C. and $-164°$ C.

JOHN D. CALFEE.
ROBERT M. THOMAS.

REFERENCES CITED

The following references are of record in the file of this patent:

UNITED STATES PATENTS

| Number | Name | Date |
|---|---|---|
| 2,172,403 | Otto et al. | Sept. 12, 1939 |
| 2,243,470 | Morway et al. | May 27, 1941 |